Oct. 1, 1957     F. C. DOBLE     2,807,956

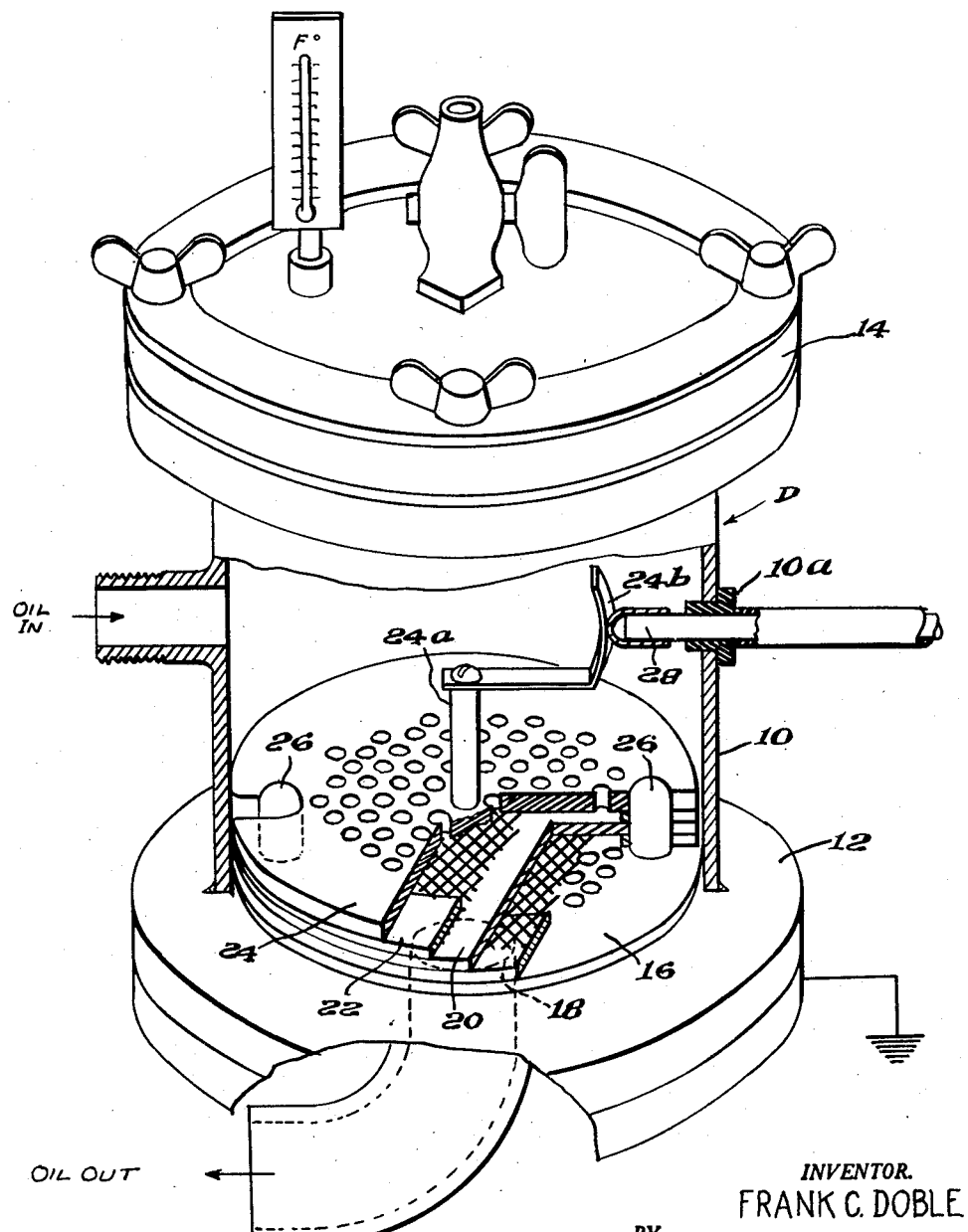

MEASUREMENT OF WATER IN FLUIDS

Filed June 17, 1953     3 Sheets-Sheet 3

INVENTOR.
FRANK C. DOBLE
BY R.W. Furlong
ATTORNEY

United States Patent Office 2,807,956
Patented Oct. 1, 1957

2,807,956
MEASUREMENT OF WATER IN FLUIDS

Frank C. Doble, Cambridge, Mass., assignor to Doble Engineering Company, Belmont, Mass., a corporation of Massachusetts Application June 17, 1953, Serial No. 362,230

4 Claims. (Cl. 73—73)

This invention provides new and useful apparatus for measuring water and moisture in liquids and other fluids and particularly in flowing liquids and other fluids normally having electrical insulating properties. The apparatus is designed to measure and to provide a running indication of the relative amounts of small quantities of water and moisture in flowing liquids and gases, for example, oils normally having electrical insulating properties, and this even though the water is in a state or amount which heretofore has been impossible directly to detect or measure.

It has hitherto been proposed to measure the moisture content of gases by exposing a hygroscopic or water-adsorbent material to the gas and measuring the change in electrical resistance of the material as it varies with changing water or moisture content of the gas. It has also been proposed to measure the water content of various materials by placing the material between the plates of a condenser and determining the dielectric capacity of the test cell thus formed or the dielectric constant of the material. All of these expedients offer practical difficulties in that the electrical values measured are dependent upon the physical dimensions of the test cell or detector unit, so that it is necessary to determine these dimensions very accurately. Furthermore, the dimensions must be maintained constant if recalibration of the device is to be avoided. In addition, reduction in size of the test cell to provide a readily portable device useful in restricted spaces, as for example in measuring the water content of insulating oil flowing through a pipe, is extremely difficult if not impossible since the magnitude of the electrical resistances to be measured is increased to the point where they become very difficult to measure with any degree of accuracy. In the case of capacitance measurements, the change in capacity with water content, particularly at low water contents, is so small that the sensitivity of the measurement is inadequate.

One object of the present invention is to provide electrical means for determining the water content (in either liquid or vapor form) of a fluid material which is independent of the physical dimensions of the test cell.

Another object is to provide means for determining the water content of a flowing fluid by bringing it in contact with a water-sorptive (absorptive and/or adsorptive) solid dielectric material and measuring the alternating current loss characteristics of the dielectric material.

A further object is to provide a highly sensitive apparatus for determining in a continuous manner the water content of a flowing dielectric fluid with a minimum of lag between variation in water content and the resultant electrical indication.

Other and further objects will be apparent from the drawings and from the description which follows.

The objects of the invention are achieved by placing in contact with the fluid, the water content of which is to be measured, a water-sorptive (adsorptive and/or absorptive) solid dielectirc material and determining, by a suitable electrical circuit, the alternating current electrical loss characteristics of the material. Conveniently, the water-sorptive material may be disposed between a pair of spaced electrically conductive members which serve as electrodes or as the plates of a condenser, and to which an alternating potential is applied, as shown in the embodiments illustrated in the drawings. These alternating current electrical loss characteristics vary sufficiently rapidly with the water content of the dielectric medium (which in turn rapidly varies with the water content of the water-containing fluid) as to be susceptible of continuous determination even when the fluid is in the form of a flowing stream. Thus the relative quantity of water involved can be measured continuously in terms of these electrical characteristics ("continuously" for this purpose including as frequently as may be required).

In the drawings (hereinafter more fully explained):

Fig. 3a shows one form of a principal component part thereof; and

Figure 1:
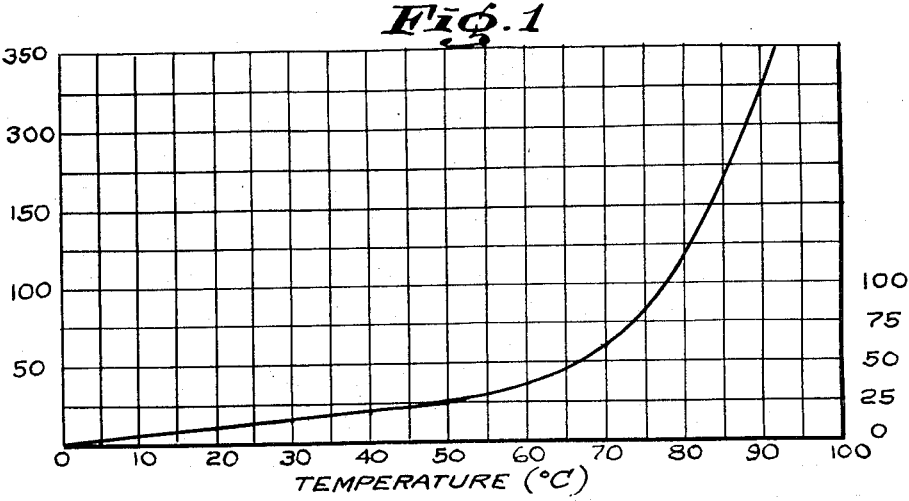
Figs. 1 and 2 are curves illustrating certain water-in-oil conditions.

By the term "alternating current electrical loss characteristics" is meant any electrical characteristic which is dependent on or proportional to the phase relation between the alternating potential applied to the test cell and the resulting current. It is particularly preferred to determine alternating current electrical loss characteristics which represent a ratio between two current components, for example, the ratio between in-phase current and total current or between in-phase and out-of-phase current or the like, and which are therefore independent of the physical dimensions of the test cell, such as power factor, loss factor, dissipation factor, phase angle, loss angle, and the like. As a practical matter, it has been noted that the power factor of the test cell is a function of the degree of saturation of the fluid with water, so that power factor measurements are most useful in determining water contents of fluids below the point of saturation. In some cases, the fluid may contain water above the point of saturation, in which case it may be preferable to determine the power dissipated (in watts) in the test cell, even though the latter characteristic is dependent upon the physical dimensions and geometry of the cell.

One of the principal advantages of the invention is its ability to measure or indicate (and if desired, to record) instantaneously or continuously the relative percentages or amounts of water in a stream of oil such as might be flowing in a pipe line, utilizing either full flow, or a part of the stream, for example a by-pass flow. Another advantage is that my invention makes possible a compact readily portable measuring device capable of use in the field with flowing oil at high rates of flow.

From a practical electrical standpoint, water mixes with oil in different forms or states of division, one form of water-in-oil mixture being commonly referred to as water in suspension, and another form commonly referred to as water in solution.

Some authorities consider the variations in water and oil mixtures to be simply differences in particle size of the involved molecules, units, or clusters of water.

Water in suspension would be of large particle size, while water in solution would be the smallest particle size, molecular size. Intermediate between these extremes would be found various particle sizes, including colloidal dispersions.

It should be mentioned that while workers in the art are not in complete agreement as to the exact physical and/or chemical conditions which constitute water in suspension and water in solution in an oil, such persons will understand and be able to practice the present invention without regard to whether, or to what extent, the water in oil strictly and technically be regarded either as in suspension, fine state of division, colloidal, in solution, or any of these states, or combinations thereof.

In the more concentrated form, commonly called water in suspension, or even free water, its effect electrically on the insulating value of the oil is very great, for example, even a few (10 to 15) parts per million of water in this form may greatly reduce or impair the value of the oil as an insulating medium.

The principal means heretofore and currently available for indicating the presence of so-called water in suspension is the high voltage breakdown test employing special apparatus arranged to apply high voltage between two spaced metal electrodes immersed in the oil, which apparatus measures the voltage required to break down or rupture the oil between the electrodes. Under some conditions, a small amount (10 to 15 parts per million) of so-called water in suspension may lower the breakdown value to some low point which may cause electrical failure of the insulating oil under service conditions.

Another test for water in suspension has provided means for measuring the electrical loss of power factor of the oil when a voltage is impressed on suitable spaced electrodes immersed in the oil. In the conventional test apparatus currently available, the power factor of good "dry" oil may be of the order of one one-hundredth of one percent, or even less. The presence of a small amount (10 to 15 parts per million) of so-called water in suspension may increase the power factor to several percent.

The less concentrated form of water in oil, commonly referred to as water in solution (which actually may be, in part at least, simply a very fine state of division or dispersion) is not detectable by either the high-voltage breakdown test or the power-factor test. Under certain conditions a given oil may contain more than a hundred parts per million of so-called water in solution without noticeably impairing the momentary (instantaneous reading) value of the oil as an insulating medium.

While this so-called water in solution may not cause breakdown in its existing state even in the relatively large quantities mentioned above, nevertheless it may be a great potential hazard because a drop in temperature may quickly change some of the water from this temporarily harmless condition into a very dangerous (more coalesced) condition that can cause electrical breakdown.

The amount of so-called water in solution which an oil can hold or tolerate varies with temperature as shown by the typical curve of Fig. 1, taken from heretofore published data. Reference to this curve shows that an oil may hold 25 parts per million of water in solution at a temperature of 50° C., whereas the same oil can hold several times as much water (i. e., 120 parts per million) at 80° C. If an oil is saturated with so-called water in solution, for example, 120 parts per million at 80° C., a drop in temperature will decrease the tolerance of the oil for such water in solution and the excess of this form of water will condense and/or coalesce to a more concentrated coarser state of division (larger particle size) which may be a dangerous hazard under certain electrical operating conditions.

The need for a device to indicate rapidly and continuously the presence of such a potentially dangerous water condition has long been recognized, particularly in connection with the use in the field of transformer oil reclamation devices, such as filter presses, but heretofore no such apparatus has been available.

The apparatus and method which I have invented indicates the presence of water in flowing oil whether the water be present in solution, suspension, or any other form. My invention makes it possible to determine the relative amount (even a small amount) of water in flowing oil, as by indications on a deflecting-type of instrument or meter, or a recording meter.

It is desirable to bring all parts of the flowing oil or other fluid stream into contact with the dielectric medium in order to insure truly representative readings. Accordingly, it is preferred to bring the stream of oil or other fluid into contact with the dielectric medium in such a manner (subdivided or attenuated, etc.) as to insure that water droplets (which may be uniformly or non-uniformly dispersed in the flowing mass) will not pass the dielectric without contacting it so as to be measured. Excellent results have been obtained with the dielectric medium disposed between closely-spaced electrodes; the extent of the interfacial contact between the oil or other fluid and the dielectric medium, as well as the electrode area, being sufficiently great as to provide the desired sensitivity for accurate representative measurements.

Accordingly, in order to achieve a desirable high rate of flow through a measuring device sufficiently compact in size so as to be readily portable, as is required for a device to be used in the field to measure the water content of transformer oil, for example, while it is being circulated through a filter press, I prefer to employ as the dielectric medium a thin layer of liquid-permeable material through the numerous interstices of which the oil can flow at a substantial rate, and to dispose the layer of dielectric material between closely spaced perforate electrodes transversely of the direction of flow of the oil. Although it is preferred to employ a fluid-permeable or liquid-permeable dielectric medium, i. e., one which permits a substantial fluid or liquid flow therethrough, it is contemplated that there may be used a fluid-impermeable dielectric medium between a pair of closely spaced electrodes with the fluid flowing along the surface of the dielectric medium rather than through the substance thereof.

If a liquid-permeable dielectric medium, for example porous paper, be held between two perforate electrodes and a water-in-oil or other water-in-fluid mixture flows through the electrodes and the interposed paper or other dielectric medium the indicated electrical loss characteristics measured between the electrodes will vary as water is picked up or given off by the paper. When a stable mixture of oil or other fluid and water is passed through the paper in sufficient amount, an equilibrium will be reached between the water-pick-up of the paper and the water content of the fluid. Under such conditions the measured reading (after an unimportant brief lag varying with the rate of flow, etc.) will level off and become substantially constant despite continued flow of the mixture through the paper medium even though an unlimited amount of the mixture is passed therethrough. Furthermore, when the device is arranged in a continuous flow system, variations in the water content of the mixture can be indicated and recorded. Also, it is possible to measure fairly rapidly changing conditions of either increasing or decreasing amounts of the water in the flowing fluid. When water in oil is in a dissolved or finely divided state, its distribution in flowing oil may be substantially uniform. However if free water in the form of discrete drops or droplets is present in the oil, its distribution may not be uniform and in some parts therefore the concentration will be high. In such a situation, the rapid and considerable change shown by the indicator in response to the high loss condition created in the medium by the high concentration of water, provides a positive indication of free water in the oil, which is one of the important desirable features of my invention.

Figure 2:
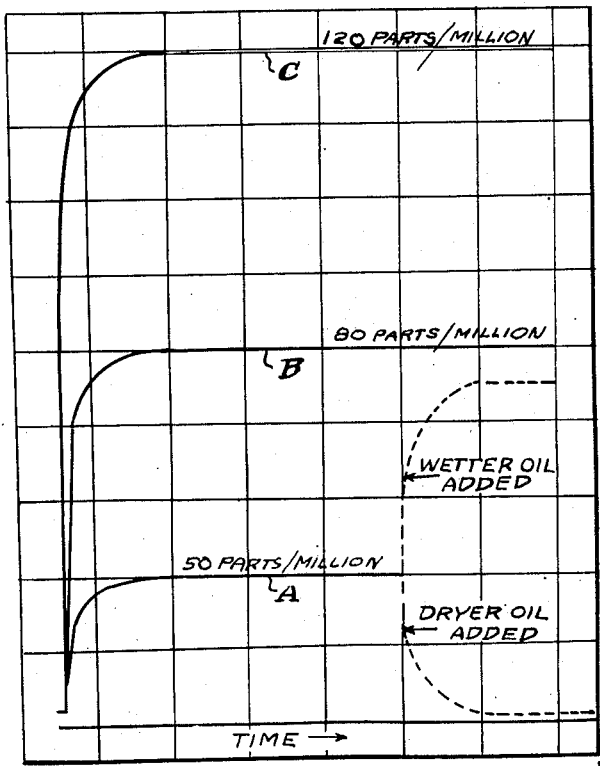

Referring to Fig. 2, there are shown curves A, B, and C, illustrating alternating current electrical loss characteristics (plotted against time of absorption) of samples of a given dry paper when three water-containing oils of different specified water-content are passed therethrough at a substantially constant temperature (68° F.), said oils varying only in the water-content thereof. It will be seen in each case that the loss characteristic rises to a maximum from an initial low value and levels off at a value indicative of the water content of the oil. Curve A of oil (of the order of 50 parts of water per million) illustrates by added dotted curves that if a dryer oil is added to the oil being passed through the detector, the curve will droop at the right hand side, and if a wetter oil is passed through the curve rises at the right hand side, and the same would be true of curves B and C if similar additions were made to those oils. Thus it will be seen that measurable electrical loss characteristics vary with the change of water-content of the oil being passed through the permeable dielectric medium and thus afford a basis for usefully determining the change and amount thereof.

My invention therefore makes it possible to determine the amount or presence of water in flowing oils or other fluids as indicated by stabilized readings of the measuring apparatus. A particularly novel and useful feature of this invention is its ability to detect the presence of water in a fluid in motion such as oil flowing in a pipe as from a transformer T (see Fig. 3) utilizing either the full flow or a part of the stream, for example, a by-pass flow. It is desirable, in order to insure uniformly mixed water in oil, to employ a suitable mixing device M in the oil pipe line, particularly when the apparatus as shown is operated with a detector D taking by-pass flow, in accordance with the way the valves V are manipulated.

Figure 3:
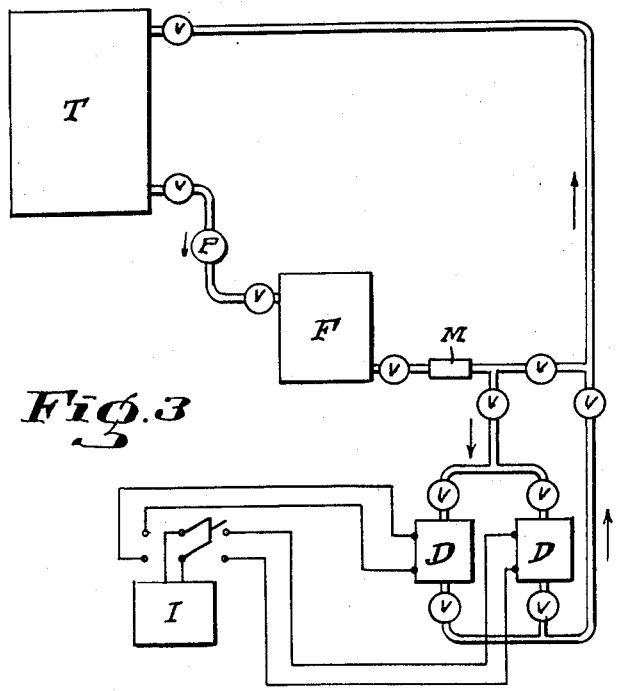
Fig. 3 illustrates generally a typical set-up for practicing the invention.

The invention, in the embodiment illustrated in Fig. 3, involves the use of a combination of at least two essential parts, one a suitable test cell or detector unit D including a hydraulic system through which the water-containing oil may be continuously passed to the detector, and two, a suitable circuit instrument I for measuring (steady or changing) alternating current electrical loss characteristics of the water-containing oil passing through the detector D.

In actual practice for continuous operation it may be desirable, as shown in Fig. 3, to have two detectors D available so that one may be used while the other is being fitted with a fresh dielectric medium, as may be required from time to time. This may be done in the closed hydraulic system as shown, leading the oil from the transformer T (or whatever other device the insulating oil is being taken from) passed through a pump P, a filter press F for filtering and mixer M to whichever of the detectors is being employed, and thence back to the transformer T. As heretofore mentioned, the apparatus may be operated as either full-flow or by-pass, as desired, and with either of the detectors D connected to the instrument. Referring to the detector D itself, a convenient form of detector D is shown in Fig. 3a, wherein a metal body portion 10, mounted on a metal base 12 with a removable top 14, contains a series of slidably removable disks 16, 18, 20, 22, and 24 held in place on insulating pins 26. The disks, from bottom to top, comprise perforated metal disk 16, lower wire screen disk 18, fluid-permeable dielectric disk 20, upper wire screen disk 22, and upper perforated metal disk 24, the upper disks 22 and 24 being smaller in diameter than the inner diameter of the body portion 10 and thus not in electrical conducting relation to the lower disks 16 and 18 which ground through the body 10 and base 12, as indicated. The upper disk 24 is provided with a metallic center post 24a and spring member 24b in contact with terminal 28 insulated from the body 10 by bushing 10a. Thus the insulating disk 20 is closely held between two electrically conductive screens, each with a separate electrical lead through wires (as shown in Fig. 3) to the instrument I. If desired, upper perforated metal disk 24 may be eliminated when the direction of oil flow is downward through the device, as indicated, electrical contact being made directly with upper screen wire 22.

Figure 4:
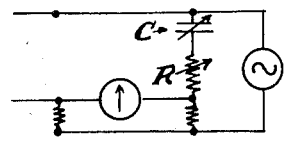
Figs. 4 to 6 show various electrical circuits that may be employed in the apparatus for measuring percentages of amounts of water in terms of electrical characteristics.
Figure 6:
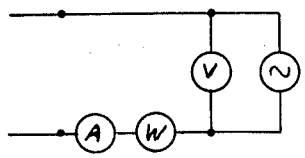
Figure 5:
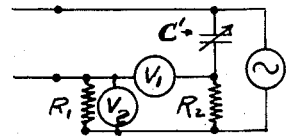

The instrument may include any one of various circuits for indicating and measuring the alternating current electrical loss characteristics of the dielectric medium, for examples as illustrated in Figs. 4 to 6, the preferred circuit being Fig. 5.

Fig. 4 shows a circuit involving an A. C. bridge-resistance method for determining loss characteristics in terms of dissipation factor, i. e. when C and R are adjusted to give a nul reading on the meter, dissipation factor $= WRC$ ($W = 2$ pi $\times$ frequency of A. C. source).

Fig. 5 illustrates a circuit for determining loss characteristics in terms of power factor (component separation) method. When $C_1$ is adjusted to give a minimum of $V_1$, $$\text{power factor} = \frac{V_1}{V_2}$$

In this case, for accuracy, the impedances of R1 and R2 must be very small in comparison with the impedance of $C_1$, of the detector D, and of the voltmeters.

Fig. 6 illustrates a circuit for determining loss characteristics in terms of power dissipation, using a wattmeter (W). In this case, power factor may be computed from the equation:

$$\text{power factor} = \frac{\text{watts}}{\text{volts} \times \text{amperes}}$$

Suitable circuit arrangements for measuring power factor, for example, are shown in more detail in Povey et al. U. S. Patent 2,273,066, granted February 17, 1942, and Browning et al. 2,329,098, granted September 7, 1943, and such circuits, which provide means for measuring the total current and also means for balancing out the current component which is out of phase with the applied potential while permitting the in-phase current to be measured, are particularly preferred. The power factor, of course, is merely the ratio of the in-phase current component to the total current, while the dissipation factor is the ratio of the in-phase current component to the out-of-phase current component.

In all of these cases it is relatively simple to calibrate the instrument for a given detector D with an appropriate porous dielectric medium 20 by flowing a number of oils of different known water contents through the detector D. For example, with a medium such as paper napkin material weighing approximately 2 grams per sq. ft. with a diameter of about 2½", 1 to 400 gallons of oil an hour may be passed through the filter (at a temperature of 68° F.) at a pressure drop of less than ten lbs./sq./in., with the instrument providing accurate indications of the relative amount of water therein, after having been calibrated from known data.

The frequency of the alternating current or alternating potential applied to the electrodes of the detector is not critical but may be varied over a wide range, frequencies as low as 40 cycles per second and even lower, and up to a kilocycle and more being practical.

A variety of water-sorptive natural or artificial dielectric materials permeable to ordinary insulating oils are preferred for use in my detector, including filter paper; textile fabrics, woven or unwoven; glass fiber mats, woven or unwoven; leather; sintered glass; a layer of particulate solid dielectric material, such as silica gel particles; etc. It is desirable that the dielectric material be thin, of the order of 0.01 to 0.10 inch, so that the water content of the dielectric material and of the water-containing oil will rapidly achieve a state of equilibrium to permit accurate determination of variations in water content of the flowing oil, although thicker dielectric materials may be employed with a resultant longer lag in response. Also, it is desirable to employ a thin layer of dielectric material in order to minimize the resistance presented to the flow of oil therethrough. When the present invention is employed to measure the water content of oil passing through a filter press, the device may be organized and arranged so as to use a portion of one or more of the layers of paper (or other filtering medium) of the filter press as the dielectric medium with the provision of suitable electrodes.

After suitable calibration of my detector, it is possible to measure directly the relative water content of flowing insulating oil at any given instant, or to measure it continuously if desired.

Although I have herein described particularly the use of my invention for measuring the water content of electrical insulating oils, it is equally valuable for measuring the water content of other dielectric fluids, particularly flowing fluids, including gases such as air, nitrogen, carbon dioxide, etc., as well as other liquids including carbon tetrachloride, dichlorodifluoromethane (Freon), acetone, alchol, etc., as well as gases or liquids containing dispersed solid particles sufficiently finely divided as to pass through or around the solid dielectric material between the electrodes. The water content of these latter materials may also be measured by my invention when the materials are in a vaporized or gaseous condition.

This application is a continuation-in-part of my prior co-pending application, Serial No. 321,640, filed November 20, 1952, now abandoned, to the extent that said prior application discloses the subject matter claimed herein.

Although I have herein described specific embodiments of my invention, I do not intend to limit myself solely thereto, but to include all of the obvious variations and modifications within the spirit and scope of the appended claims.

I claim:

1. Apparatus for utilizing a portion of the moisture content of a sample of electrically insulating fluid in testing for moisture, which comprises a container for the fluid sample having an inlet and an outlet for the fluid, a unit extending transversely across the container between the inlet and outlet dividing the container into compartments communicating with each other through the unit, the unit being formed of electrically conductive electrodes electrically insulated from each other by a water-sorptive solid dielectric material permeable to said fluid sandwiched therebetween, the electrodes being perforate permitting passage of the fluid through the unit from one compartment to the other whereby the dielectric comes in contact with all of the fluid flowing through the unit while the fluid is permitted to flow through the unit and thereby establishing an equilibrium between the moisture content of said dielectric material and the moisture content of the fluid under study and the moisture content of the dielectric is thereby adjusted to an amount depending upon the moisture content of the fluid flowing through the unit, means for continuously passing the fluid under study through said dielectric material, an electric circuit connected to the electrodes completed through the dielectric sensitive to variations in the moisture content of the dielectric due to the moisture present in the fluid, and an indicator in said circuit for giving an indication of these changes in electrical characteristics.

2. Apparatus as defined in claim 1 in which said circuit is sensitive to variations in alternating current loss characteristics of the dielectric between the electrodes.

3. Apparatus as defined in claim 1 in which said circuit is sensitive to variations in power factor of the dielectric between the electrodes.

4. Apparatus as defined in claim 1 further characterized in that said solid dielectric material is porous paper.

References Cited in the file of this patent

UNITED STATES PATENTS

| | | |
|---|---|---|
| 1,708,073 | Allen | Apr. 9, 1929 |
| 2,266,350 | Womack | Dec. 16, 1941 |
| 2,349,992 | Schroder | May 30, 1944 |
| 2,535,026 | Anderson | Dec. 26, 1950 |
| 2,679,027 | Clark | May 18, 1954 |
| 2,682,168 | McDonald | June 29, 1954 |
| 2,734,377 | Traver | Feb. 14, 1956 |

FOREIGN PATENTS

| | | |
|---|---|---|
| 869,427 | Germany | Mar. 5, 1953 |